US010807640B2

(12) United States Patent
Kim et al.

(10) Patent No.: US 10,807,640 B2
(45) Date of Patent: Oct. 20, 2020

(54) MOTOR CONTROL APPARATUS AND METHOD OF MOTOR DRIVEN POWER STEERING SYSTEM

(71) Applicant: HYUNDAI MOBIS CO., LTD., Seoul (KR)

(72) Inventors: Cheon Kyu Kim, Seoul (KR); Ji Hoon Yoo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 295 days.

(21) Appl. No.: 15/963,539

(22) Filed: Apr. 26, 2018

(65) Prior Publication Data

US 2018/0312196 A1 Nov. 1, 2018

(30) Foreign Application Priority Data

Apr. 27, 2017 (KR) ........................ 10-2017-0054207

(51) Int. Cl.
*B62D 15/02* (2006.01)
*B62D 5/04* (2006.01)
*H02P 21/22* (2016.01)
*H02P 21/18* (2016.01)
*B62D 6/00* (2006.01)

(52) U.S. Cl.
CPC ......... *B62D 15/0235* (2013.01); *B62D 5/046* (2013.01); *B62D 5/0463* (2013.01); *B62D 5/0484* (2013.01); *B62D 6/001* (2013.01); *H02P 21/18* (2016.02); *H02P 21/22* (2016.02)

(58) Field of Classification Search
CPC .. B62D 15/0235; B62D 5/046; B62D 5/0484; B62D 5/0463; B62D 6/001; H02P 21/22; H02P 21/18; H02P 2203/07
USPC ........................................................ 701/1, 42
See application file for complete search history.

(56) References Cited

U.S. PATENT DOCUMENTS 6,046,560 A * 4/2000 Lu ........................ B62D 5/0463 180/443
6,107,767 A * 8/2000 Lu .......................... B62D 5/046 318/432
6,691,817 B2 * 2/2004 Wilson-Jones ...... B62D 5/0484 180/404
7,004,278 B2 * 2/2006 Sugitani ................. B62D 6/008 180/402

(Continued)

FOREIGN PATENT DOCUMENTS

KR 10-2014-0047437 A 4/2014

*Primary Examiner* — Jaime Figueroa
(74) *Attorney, Agent, or Firm* — Knobbe Martens Olson & Bear LLP

(57) ABSTRACT

A motor control apparatus of a motor driven power steering (MDPS) system may include: a steering logic controller configured to calculate a current command value for motor control, and transmit the current command value; a current measurement sensor configured to measure a current applied to the motor; and a controller configured to calculate a motor position increment based on the current command value received from the steering logic controller, the measured current value received from the current measurement sensor, and previously stored motor parameters, estimate a current motor position by integrating the calculated motor position increments, and control the motor using the estimated current motor position.

6 Claims, 4 Drawing Sheets

(56) References Cited

U.S. PATENT DOCUMENTS 7,187,154 B2 * 3/2007 Ta ........................ B62D 5/046 318/432
7,345,442 B2 * 3/2008 Ta ........................ B62D 5/046 180/446
7,725,227 B2 * 5/2010 Pattok ..................... B62D 6/04 701/41
8,670,904 B2 * 3/2014 Yoneda .................. B62D 5/046 180/404
8,924,081 B2 * 12/2014 Sonoda ................ B62D 5/0406 180/432
9,577,555 B2 2/2017 Wu et al.
9,688,302 B2 * 6/2017 Endo .................... B62D 5/0487
10,003,285 B2 * 6/2018 Pramod ..................... H02P 6/08
10,457,322 B2 * 10/2019 Yoshida .................. H02P 21/22
2002/0117349 A1 * 8/2002 Wilson-Jones ...... B62D 5/0484 180/443
2004/0200661 A1 * 10/2004 Sugitani ................. B62D 6/008 180/402
2005/0242765 A1 * 11/2005 Ta ........................ B62D 5/046 318/799
2007/0029959 A1 * 2/2007 Ta ........................ B62D 5/046 318/432
2007/0205041 A1 * 9/2007 Nishizaki ............ B62D 5/0472 180/446
2008/0147276 A1 * 6/2008 Pattok ..................... B62D 6/04 701/42
2009/0240389 A1 * 9/2009 Nomura ................. B62D 5/046 701/31.4
2011/0035114 A1 * 2/2011 Yoneda .................. B62D 5/046 701/42
2011/0066332 A1 * 3/2011 Sonoda ................ B62D 5/0406 701/42
2015/0175193 A1 * 6/2015 Endo .................... B62D 5/0487 701/29.2
2015/0372623 A1 * 12/2015 Pramod ..................... H02P 6/08 318/400.02
2018/0273090 A1 * 9/2018 Yoshida ............... B62D 5/0463
2019/0256131 A1 * 8/2019 Mori ....................... H02P 27/08

* cited by examiner

MOTOR CONTROL APPARATUS AND METHOD OF MOTOR DRIVEN POWER STEERING SYSTEM

CROSS-REFERENCES TO RELATED APPLICATIONS

The present application claims priority to Korean application number 10-2017-0054207, filed on Apr. 27, 2017, which is incorporated by reference in its entirety.

BACKGROUND OF THE INVENTION

The present invention relates to a motor control apparatus and method of a motor driven power steering (MDPS) system, and more particularly, to a motor control apparatus and method of an MDPS system, which can estimate the position of a rotor when a position sensor is not installed or has broken down.

An MDPS refers to a device which facilitates steering by providing a part of steering torque using an auxiliary power source, the steering torque being applied to a steering wheel by a driver when the driver steers a vehicle. That is, when the vehicle is parked or stopped or driven at low speed, the MDPS may provide a large force to lessen the driver's force. Furthermore, when the vehicle is driven at high speed, the MDPS may provide only a small force to maintain the stability of the vehicle body.

The MDPS is a steering system which uses an electric motor to provide power, instead of a hydraulic steering system operated by a hydraulic pressure. The MDPS can provide the optimal steering force for each speed, thereby reducing fuel efficiency while performing an environment-friendly operation.

In general, the MDPS system detects the position angle of a motor using a position sensor connected to a rotor of the motor, calculates a phase electrical angle through the detected position angle, and uses the phase electrical angle for vector control of the motor, steering control logic, and fail detection and the like. With the development of technology, various sizes of motors are used in various technical fields. The motor is driven by rotating the rotor using a permanent magnet and a coil which changes its polarity according to a current applied thereto.

Among the various motors, a brushless motor is driven by an electronic rectification mechanism without mechanical contacts such as a brush and commutator, and includes a rotor constituted by a permanent magnet and stators corresponding to a plurality of phases. The brushless motor can rotate the rotor using a magnetic force generated by phase voltages of the respective coils of the stators.

Therefore, it is very important to check the position of the rotor, in order to accurately drive the brushless motor.

In the related art, a sensor motor using a hall sensor or the like has been used to check a position of the rotor. However, the sensor motor has limits in that it has a large size and complex structure. Furthermore, when the sensor has broken down, the position of the rotor cannot be recognized, which makes it impossible to drive the motor.

The related art of the present invention is disclosed in Korean Patent Publication No. 10-2014-0047437 published on Apr. 22, 2014 and entitled "Motor rotor position detection method and apparatus".

SUMMARY OF THE INVENTION

Embodiments of the present invention are directed to a motor control apparatus and method of an MDPS system, which can estimate the position of a rotor using a rotor position increment when a position sensor is not installed or has broken down.

In one embodiment, a motor control apparatus of an MDPS system may include: a steering logic controller configured to calculate a current command value for motor control, and transmit the current command value; a current measurement sensor configured to measure a current applied to the motor; and a controller configured to calculate a motor position increment based on the current command value received from the steering logic controller, the measured current value received from the current measurement sensor, and previously stored motor parameters, estimate a current motor position by integrating the calculated motor position increments, and control the motor using the estimated current motor position.

The controller may include a current controller configured to generate a voltage command value for compensating for an error between the current command value received from the steering logic controller and the measured current value received from the current measurement sensor.

The motor control apparatus may further include a storage configured to store the motor parameters including motor resistance and motor inductance, and store the current voltage command value generated through the current controller such that the controller calculates a motor position increment at the next calculation period.

The controller may include a motor velocity calculator configured to calculate a motor velocity using the current voltage command value generated through the current controller, the measured current value inputted from the current measurement sensor, and the motor resistance and motor inductance stored in the storage.

The controller may include a motor position increment calculator configured to calculate the motor position increment using the motor velocity calculated through the motor velocity calculator, the measured current value inputted from the current measurement sensor, and the previous voltage command value which is previously generated by the current controller and stored in the storage.

In another embodiment, a motor control method of an MDPS system may include: receiving, by a controller, a current command value for motor control from a steering logic controller; receiving, by the controller, a measured current value from a current measurement sensor; calculating, by the controller, a motor position increment based on the current command value received from the steering logic controller, the measured current value received from the current measurement sensor, and previously stored motor parameters; and controlling, by controller, the motor using a current motor position estimated by integrating the calculated motor position increments.

The calculating of the motor position increment may include generating, by the controller, a voltage command value for compensating for an error between the current command value received from the steering logic controller and the measured current value received from the current measurement sensor.

The calculating of the motor position increment may include storing the current voltage command in a storage such that the controller calculates a motor position increment at the next calculation period.

The calculating of the motor position increment may include calculating, by the controller, a motor velocity using the generated current voltage command value, the measured current value inputted from the current measurement sensor, and the motor resistance and motor inductance stored in the storage.

The calculating of the motor position increment may include calculating, by the controller, the motor position increment using the calculated motor velocity, the measured current value inputted from the current measurement sensor, and the previous voltage command value stored in the storage.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
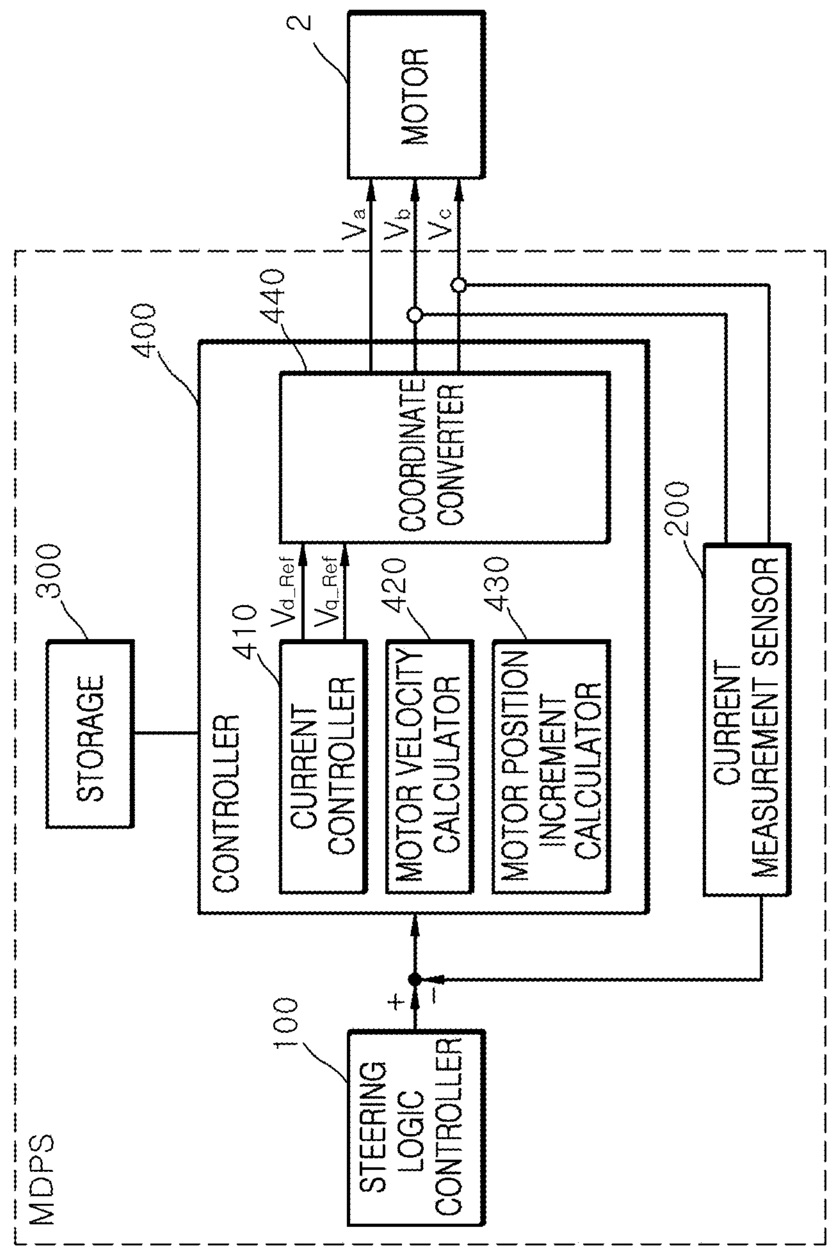
FIG. 1 is a block diagram illustrating a motor control apparatus of an MDPS system in accordance with an embodiment of the present invention.
Figure 2:
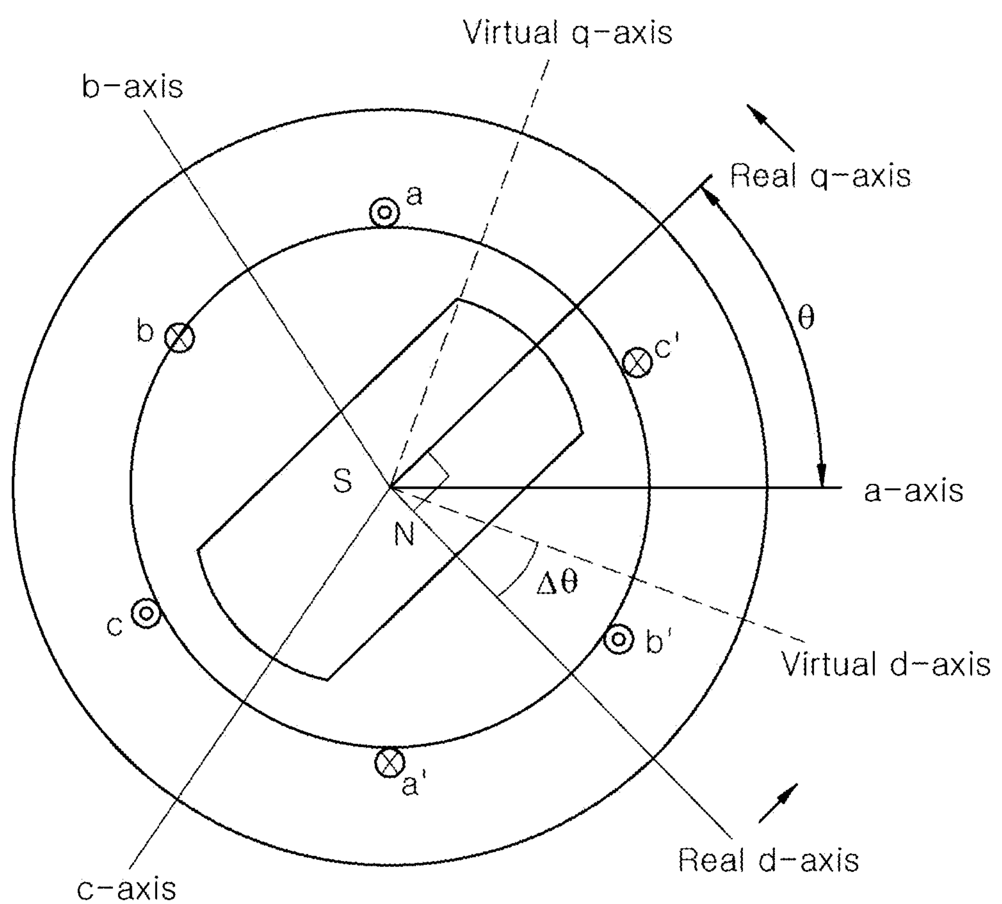
FIG. 2 illustrates BLAC motor coordinates of the MDPS system in accordance with an embodiment of the present invention.
Figure 3:
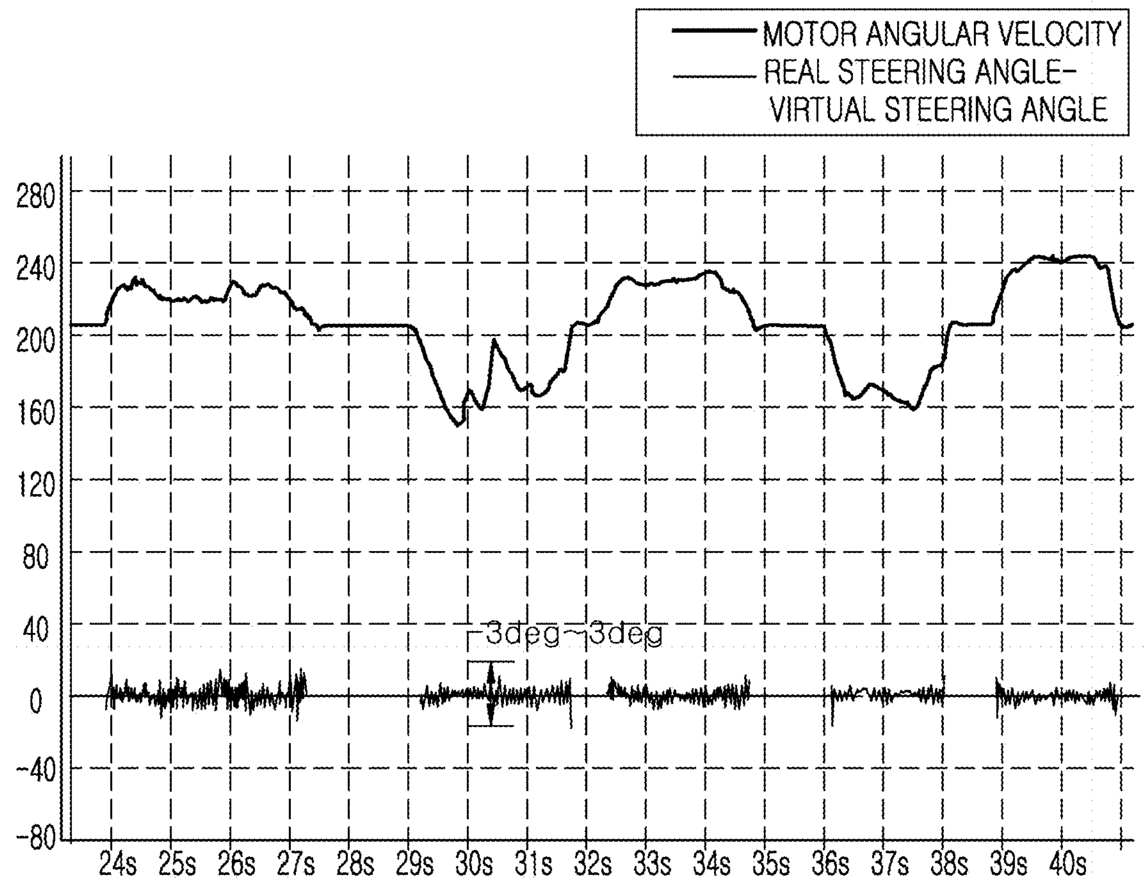
FIG. 3 illustrates a motor angular velocity of the MDPS system in accordance with the embodiment of the present invention, and a difference between an actual steering angle and a virtual steering angle.

FIG. 1 is a block diagram illustrating a motor control apparatus of an MDPS system in accordance with an embodiment of the present invention, FIG. 2 illustrates brushless alternating current (BLAC) motor coordinates of the MDPS system in accordance with the embodiment of the present invention, and FIG. 3 illustrates a motor angular velocity and a difference between a real steering angle and a virtual steering angle in the MDPS system in accordance with the embodiment of the present invention.

As illustrated in FIG. 1, the motor control apparatus of the MDPS system in accordance with the embodiment of the present invention may include a steering logic controller 100, a current measurement sensor 200, a storage 300, and a controller 400.

The steering logic controller 100 may calculate a current command value required for the MDPS system 1, and transmit the current command value to the controller 400. That is, the steering logic controller 100 may calculate a current command required to control the motor 2. In other words, the steering logic controller 100 may calculate a current required for assisting a driver's steering.

The current measurement sensor 200 may measure a current applied to the motor 2. That is, the current measurement sensor 200 may measure a current through a current sensor included therein, and convert the measured current value into a coordinate system value for vector control. For example, the current measurement sensor 200 may coordinate-transform 3-phase alternating currents (AC) into 2-phase direct currents (DC), and transmit the 2-phase DC to the controller 400. In other words, the current measurement sensor 200 may calculate measured stator reference currents Ia, Ib and Ic as 2-phase rotor reference currents Id and Iq.

The storage 300 may previously store motor parameters including motor resistance and motor inductance of the motor 2, and store a voltage command value generated by the controller 400. In the present embodiment, it has been described that the motor parameters are stored in the storage 300 in advance. However, the motor parameters may be calculated by separate calculation logic or calculation formula.

The controller 400 may include a current controller 410, a motor velocity calculator 420, a motor position increment calculator 430 and a coordinate converter 440, in order to control the motor 2.

That is, the controller 400 may calculate a motor position increment based on the current command value received from the steering logic controller 100, the measured current value received from the current measurement sensor 200, and the motor parameters stored in the storage 300 in advance. The controller 400 may estimate the current position of the motor by integrating the calculated motor position increments. The controller 400 may control the motor using the estimated current motor position.

The motor position estimation process of the controller 400 will be described in more detail.

The current controller 410 may generate a voltage command value for compensating for an error between the current command value received from the steering logic controller 100 and the measured current value received from the current measurement sensor 200. That is, an error between the current command and the current applied to the motor 2 and measured by the current measurement sensor 200 may be used to follow the current command.

In other words, the current controller 410 may compare the current command value calculated by the steering logic controller 100 to the current fed back from the current measurement sensor 200, and calculate a voltage applied to the motor based on an error between the current command value and the feedback current. At this time, the current controller 410 may use coordinate-transformed 2-phase current values. Therefore, two current controllers 410 may be required to control the d-axis and q-axis of the 2-phase currents, respectively. That is, the current controllers 410 may acquire current voltage command values Vd and Vq based on the rotor.

In the present embodiment, PI controllers may be used as the current controllers 410.

The output values of the current controllers 410 may be converted into 3-phase AC voltage values through the coordinate converter 440, applied as voltages to the motor 2, and used to control the current of the motor 2. That is, the coordinate converter 440 can convert DC outputs into 3-phase voltages, the DC outputs being calculated by the current controllers 410 using a vector control technique for converting 3-phase AC motor currents into 2-phase DC values.

At this time, the position of the rotor may be estimated because the rotor position needs to be recognized in order to perform coordinate transformation.

Therefore, in order to estimate the rotor position, the motor velocity calculator 420 may calculate a motor velocity using the current voltage command value generated through the current controller 410, the measured current value inputted from the current measurement sensor 200, and the motor resistance and motor inductance stored in the storage 300.

At this time, the motor velocity calculator 420 may calculate the motor velocity through the following equation.

$$\omega=(V\_q-RI\_q-L(dI\_q)/dt)/((LI\_d+\theta))$$

Here, ω represents the rotation angular velocity of the motor, V_q represents a Q-axis command voltage, R represents resistance, I_q represents a Q-axis measured current, L represent inductance, I_d represents a D-axis measured current, and Φ represents motor magnetic flux.

That is, the motor velocity calculator 420 may calculate a motor rotor velocity using the current voltage command value, the 2-axis rotor reference currents and the motor resistance and inductance.

The motor position increment calculator 430 may calculate a motor position increment using the motor velocity calculated through the motor velocity calculator 420, the measured current value inputted from the current measurement sensor 200, and the previous voltage command value which has been generated by the current controller 410 and stored in the storage 300.

That is, as illustrated in FIG. 2, the motor position increment calculator 430 may calculate a difference between a virtual rotor position (virtual q-axis, d-axis) and a real rotor position (real q-axis, d-axis). Based on the supposition that the virtual rotor position is different from the current rotation position, the motor position increment calculator 430 may calculate the position difference of the rotor in order to estimate the current rotor position.

At this time, the motor position increment calculator 430 may calculate the difference between the virtual rotor position and the real rotor position through the following equation.

$$\Delta\theta=\arctan((RI\_d+L(dI\_d)/dt-V\_d-\omega LI\_q)/(-RI\_q-L(dI\_q)/dt+V\_q-\omega LI\_d))$$

Here, Δθ represents a difference between the virtual DQ-axis and the real DQ-axis, and V_d represents a D-axis command voltage.

That is, the motor position increment calculator 430 may acquire a motor rotor position increment against the previous calculation period, using the current motor velocity calculated by the motor velocity calculator 420, the 2-phase reference currents, and the previous voltage command value. At this time, the motor position increment calculator 430 may use the previous voltage command value stored in the storage 300.

Then, the controller 400 may estimate a motor rotor position by integrating the motor position increments calculated through the motor position increment calculator 430, and control the motor 2 using the estimated position.

At this time, the controller 400 may store the current voltage command value in the storage 300 in order to calculate a motor position increment at the next calculation period.

In the present embodiment, the motor 2 is an actuator which generates a torque when a current is applied by the voltage outputted from the controller 400, and may include a 3-phase BLAC motor having a permanent magnet mounted therein.

In the present embodiment, as illustrated in FIG. 3, the change of the motor angular velocity may cause a difference between a real steering angle and a virtual steering angle. The difference between the real steering angle and the virtual steering angle may range from −3 deg to 3 deg. That is, although a sensor for estimating the position of the rotor is not installed, a rotor position difference can be calculated to estimate the current rotor position, based on the supposition that there is a difference between the virtual rotor position and the current rotor position.

Figure 4:
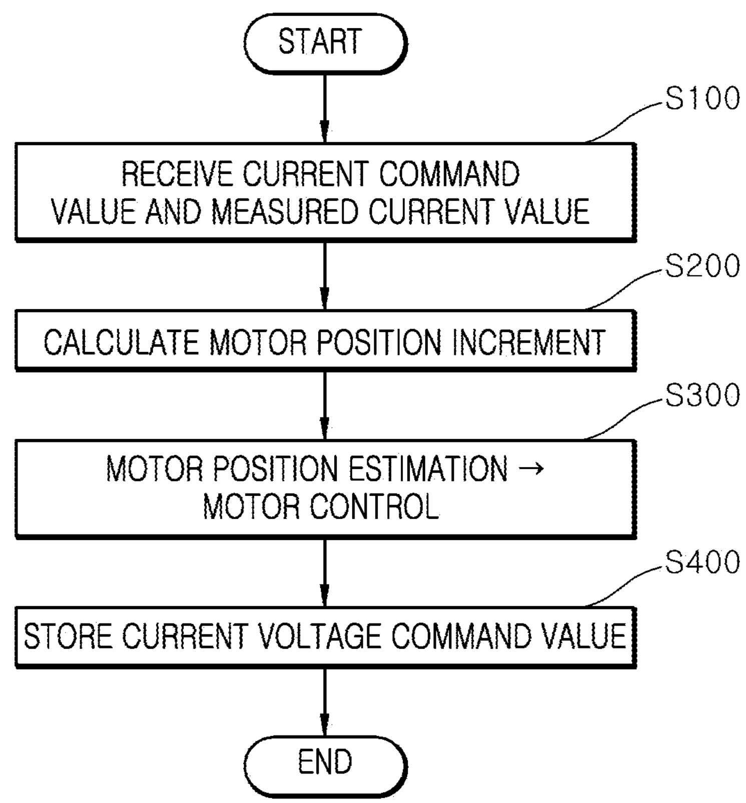
FIG. 4 is a flowchart illustrating a motor control method of an MDPS system in accordance with an embodiment of the present invention.

FIG. 4 is a flowchart illustrating a motor control method of an MDPS in accordance with an embodiment of the present invention. Referring to FIG. 4, the motor control method of the MDPS will be described as follows.

As illustrated in FIG. 4, the motor control method of the MDPS system in accordance with the embodiment of the present invention may start with step S100 in which the controller 400 receives a current command value from the steering logic controller 100, and receives a measured current value from the current measurement sensor 200.

In other words, the controller 400 may receive the current command value for motor control from the steering logic controller 100, and receive the measured current value from the current measurement sensor 200.

The steering logic controller 100 may calculate a current command value required for the MDPS system 1, and transmit the current command value to the controller 400. The current measurement sensor 200 may measure a current applied to the motor 2, and transmit the measured current to the controller 400. That is, the current measurement sensor 200 may measure a current through the current sensor included therein, and convert the measured current value into a coordinate system value for vector control.

Then, the controller 400 may calculate a motor position increment based on the current command value received from the steering logic controller 100, the measured current value received from the current measurement sensor 200, and motor parameters stored in the storage 300 in advance, at step S200.

At this time, the controller 400 may include the current controller 410, the motor velocity calculator 420, the motor position increment calculator 430 and the coordinate converter 440 in order to calculate the motor position increment, and estimate the current rotor position for controlling the motor 2 at the next step.

The current controller 410 may generate a voltage command value for compensating for an error between the current command value received from the steering logic controller 100 and the measured current value received from the current measurement sensor 200. In other words, the current controller 410 may compare the current command value calculated by the steering logic controller 100 to the current fed back from the current measurement sensor 200, and calculate a voltage applied to the motor based on an error between the current command value and the feedback current. At this time, the current controller 410 may use coordinate-transformed 2-phase current values.

Then, the motor velocity calculator 420 may calculate a motor velocity using the current voltage command value generated through the current controller 410, the measured current value inputted from the current measurement sensor 200, and the motor resistance and motor inductance which are previously stored in the storage 300.

At this time, the motor velocity calculator 420 may calculate the motor velocity through the following equation.

$$\omega = (V\_q - RI\_q - L(dI\_q)/dt)/((LI\_d + \theta))$$

Here, ω represents the rotation angular velocity of the motor, V_q represents a Q-axis command voltage, R represents resistance, I_q represents a Q-axis measured current, L represent inductance, I_d represents a D-axis measured current, and Φ represents motor magnetic flux.

That is, the motor velocity calculator 420 may calculate a motor rotor velocity using the current voltage command value, the 2-axis rotor reference currents and the motor resistance and inductance.

Then, the motor position increment calculator 430 may calculate a motor position increment using the motor velocity calculated through the motor velocity calculator 420, the measured current value inputted from the current measurement sensor 200, and the previous voltage command value stored in the storage 300.

At this time, the motor position increment calculator 430 may calculate a difference between the virtual rotor position and the real rotor position through the following equations.

$$\Delta\theta = \arctan((RI\_d + L(dI\_d)/dt - V\_d - \omega LI\_q)/(-RI\_q - L(dI\_q)/dt + V\_q - \omega LI\_d))$$

Here, Δθ represents a difference between the virtual DQ-axis and the real DQ-axis, and V_d represents a D-axis command voltage.

That is, the motor position increment calculator 430 may acquire a motor rotor position increment against the previous calculation period, using the current motor velocity calculated by the motor velocity calculator 420, the 2-phase reference currents, and the previous voltage command value. At this time, the motor position increment calculator 430 may use the previous voltage command value stored in the storage 300.

Then, the controller 400 may control the motor using the current motor position estimated by integrating the motor position increments calculated at step S200, at step S300.

That is, based on the supposition that the virtual rotor position is different from the current rotor position, the controller 400 may estimate the position of the rotor without a sensor such as a position sensor for sensing the position of the motor 2, and use the estimated position to control the motor 2.

The controller 400 may detect a failure of the position sensor using the rotor position.

Then, the controller 400 may store the current voltage command value in the storage 300 in order to calculate a motor position increment at the next calculation period, at step S400.

Therefore, the controller 400 may estimate the rotor position using the previous voltage command value and the current voltage command value.

As described above, the motor control apparatus and method of the MDPS system in accordance with the embodiments of the present invention can estimate the position of the rotor using the rotor position increment based on the virtual rotor position. Therefore, even when the position sensor is not installed or has broken down, the motor control apparatus and method can estimate the position of the rotor to drive the motor, and detect a failure of the position sensor.

Furthermore, the motor control apparatus and method in accordance with the embodiment of the present invention can estimate the position of the rotor without a sensor when a sensor is difficult to install due to a system characteristic and operation environment, which makes it possible to reduce the size of the motor while simplifying the structure.

Although preferred embodiments of the invention have been disclosed for illustrative purposes, those skilled in the art will appreciate that various modifications, additions and substitutions are possible, without departing from the scope and spirit of the invention as defined in the accompanying claims.

In the present embodiment, the motor control of the MDPS system has been described. However, this is only an example, and the rotor position estimation method in accordance with the present embodiment can be applied to all systems requiring a motor. Furthermore, the motor control apparatus and method can be applied even when the position sensor is not installed or has broken down, and thus have competitiveness in terms of fail operation and safety.

Therefore, the technical protection range of the present invention should be determined by the following claims.

What is claimed is:

1. A motor control apparatus of a motor driven power steering (MDPS) system, comprising:

a steering logic controller configured to calculate a current command value for driving a motor, and transmit the current command value;

a current measurement sensor configured to measure current values applied to the motor;

storage configured to store a plurality of motor parameters comprising motor resistance and motor inductance; and a motor controller configured to:

generate voltage command values using the current command value transmitted from the steering logic controller and the current values measured by the current measurement sensor, wherein the voltage command values comprise a d-axis voltage command value and a q-axis voltage command value, estimate a rotor position of the motor without using a position sensor, transform the voltage command values into three phase voltage values using the estimated rotor position, and apply the three phase voltage values to the motor, wherein, for estimating the rotor position without using a position sensor, the motor controller is further configured to:

calculate a rotor speed using the voltage command values, the measured current values, the motor resistance and the motor inductance, calculate a motor position increment in a predetermined period using the rotor speed, the measured current values and past voltage command values previously stored in the storage, and integrate the motor position increment for estimating the rotor position.

2. The motor control apparatus of claim 1, wherein the motor controller comprises a current controller configured to generate the voltage command values for compensating for an error between the current command value received from the steering logic controller and the measured current values that comprise a d-axis current value and a q-axis current value.

3. The motor control apparatus of claim 2, wherein the storage is configured to store the current voltage command value generated through the current controller.

4. The motor control apparatus of claim 3, wherein the motor controller comprises a motor position increment calculator configured to calculate the motor position increment.

5. A motor control method of controlling a motor of an MDPS system, the method comprising:

receiving, by a controller, a current command value for motor control from a steering logic controller;

receiving, by the controller, measured current values from a current measurement sensor;

generating voltage command values using the current command value transmitted from the steering logic controller and the current values measured by the current measurement sensor, wherein the voltage command values comprise a d-axis voltage command value and a q-axis voltage command value, estimating a rotor position of the motor without using a position sensor, transforming the voltage command values into three phase voltage values using the estimated rotor position, and applying the three phase voltage values to the motor, wherein estimating comprises:

calculating a rotor speed using the voltage command values, the measured current values, motor resistance and motor inductance, calculating a motor position increment in a predetermined period using the rotor speed, the measured current values and past voltage command values previously stored in storage, and integrating the motor position increment for estimating the rotor position.

6. The motor control method of claim 5, wherein the voltage command values are generated for compensating for an error between the current command value received from the steering logic controller and the measured current values received from the current measurement sensor, wherein the measured current values comprise a d-axis current value and a q-axis current value.

* * * * *